United States Patent [19]

Ushikoshi

[11] 4,317,188

[45] Feb. 23, 1982

[54] MAGNETIC SHIELDING PLATE FOR A STEP MOTOR IN AN ELECTRONIC WRISTWATCH

[75] Inventor: Kenichi Ushikoshi, Suwa, Japan

[73] Assignee: Kabushiki Kaisha Suwa Seikosha, Tokyo, Japan

[21] Appl. No.: 159,536

[22] Filed: Jun. 16, 1980

Related U.S. Application Data

[63] Continuation of Ser. No. 878,836, Feb. 17, 1978, abandoned.

[30] Foreign Application Priority Data

Feb. 17, 1977 [JP] Japan .................................. 52-16486

[51] Int. Cl.³ .................... G04B 37/00; H02K 1/12
[52] U.S. Cl. ...................................... 368/293; 310/256
[58] Field of Search ............... 368/88, 155, 158, 160, 368/293, 318; 310/40 MM, 190, 196, 256; 336/84 R, 84 C; 361/143

[56] References Cited

U.S. PATENT DOCUMENTS

| | | | |
|---|---|---|---|
| 1,871,345 | 8/1932 | Rigante | 336/84 C |
| 2,579,318 | 12/1951 | Hershberger | 310/190 |
| 2,964,901 | 12/1960 | Betner et al. | 368/293 |
| 3,414,483 | 1/1973 | Nurnberg et al. | 310/256 |
| 3,919,836 | 11/1975 | Nishizawa | 368/293 |
| 4,033,111 | 7/1977 | Matsuura | 368/293 |
| 4,117,665 | 10/1978 | Nakao et al. | 368/293 |

FOREIGN PATENT DOCUMENTS

2640817  3/1977  Fed. Rep. of Germany ...... 368/293

*Primary Examiner*—Vit W. Miska
*Attorney, Agent, or Firm*—Blum, Kaplan, Friedman, Silberman & Beran

[57] ABSTRACT

A magnetic shielding plate for decreasing the affects of external magnetic flux fields on a step motor in an electronic wristwatch is provided. Specifically, the step motor includes a permanent magnet rotor and a magnetic permeable stator surrounding said rotor for incrementally rotating said rotor in response to changes in the magnetic orientation of said stator. A coil assembly includes an elongated coil core coupled to the stator and a coil wrapped around the elongated core for receiving timekeeping signals. A magnetic shield plate extends the lengthwise extent of the elongated core for shielding the coil core from external magnetic fields surrounding the wristwatch. The minimum cross-sectional area of the shield in the direction perpendicular to the elongated core, taken along the lengthwise extent of the core, defines the magnetic shielding characteristics of the shielding plate.

7 Claims, 10 Drawing Figures

MAGNETIC SHIELDING PLATE FOR A STEP MOTOR IN AN ELECTRONIC WRISTWATCH

This is a continuation of application Ser. No. 878,836, filed Feb. 17, 1978, now abandoned.

BACKGROUND OF THE INVENTION

This invention is directed to a magnetic shielding plate for a step motor in an electronic wristwatch, and in particular to the use of a magnetic shielding plate to surround the coil assembly of a step motor in an electronic wristwatch for preventing the operation of the step motor from being affected by external magnetic fields.

In recent years, the popularity of quartz crystal electronic wristwatches has been due, in large measure, to two not unrelated developments in such wristwatches. The first development involved the increased accuracy that is obtained by utilizing quartz crystal vibrators capable of oscillating at extremely high frequencies as a time standard. The second development is directed to the gradual reduction in the thickness of the electronic movement in the wristwatch thereby providing electronic wristwatches that are beginning to approach the thin profile of mechanical wristwatches. Quartz crystal electronic wristwatches have now been commercialized with electronic movements having a thickness on the order of 4 mm. Accordingly, a further reduction in the thickness of an electronic timepiece movement to 3 mm or less by maximizing the use of a magnetic shielding plate is desired.

SUMMARY OF THE INVENTION

Generally speaking, in accordance with the instant invention, a magnetic shielding plate for use with a step motor in an electronic wristwatch is provided. The step motor of the electronic wristwatch is adapted to receive timekeeping signals and convert same into an incremental rotary motion and includes a permanent magnet rotor and a magnetic permeable stator surrounding the rotor for incrementally rotating the rotor in response to changes in the magnetic orientations of the stator. A coil assembly includes an elongated magnetic permeable core coupled to the stator and a coil wrapped around the elongated magnetic permeable core. The coil is provided for receiving timekeeping signals and, in response thereto, for changing the magnetic orientation of the stator. A shielding plate is constructed and arranged to surround a portion of the lengthwise extent of said coil core for shielding the coil core from external magnetic fields. The minimum cross-sectional area of the shielding plate in the direction perpendicular to the elongated core, along the lengthwise extent of the core, defines the quality of the magnetic shielding provided thereby.

Accordingly, it is an object of the instant invention to provide an improved step motor assembly for an electronic wristwatch including a magnetic shielding plate.

A further object of the instant invention is to reduce the thickness of an electronic wristwatch by including a magnetic shielding plate therein.

Still a further object of the instant invention is to minimize the affect of external magnetic fields on the operation of an electronic wristwatch.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3b is a sectional view of the coil assembly depicted in FIG. 3a;

FIG. 4b is a transverse sectional view of the coil assembly and shielding plate depicted in FIG. 4a;

FIG. 4d is a lengthwise sectional view of FIG. 4a;

DETAILED DESCRIPTION OF THE PREFERRED EMBODIMENTS

Figure 1:
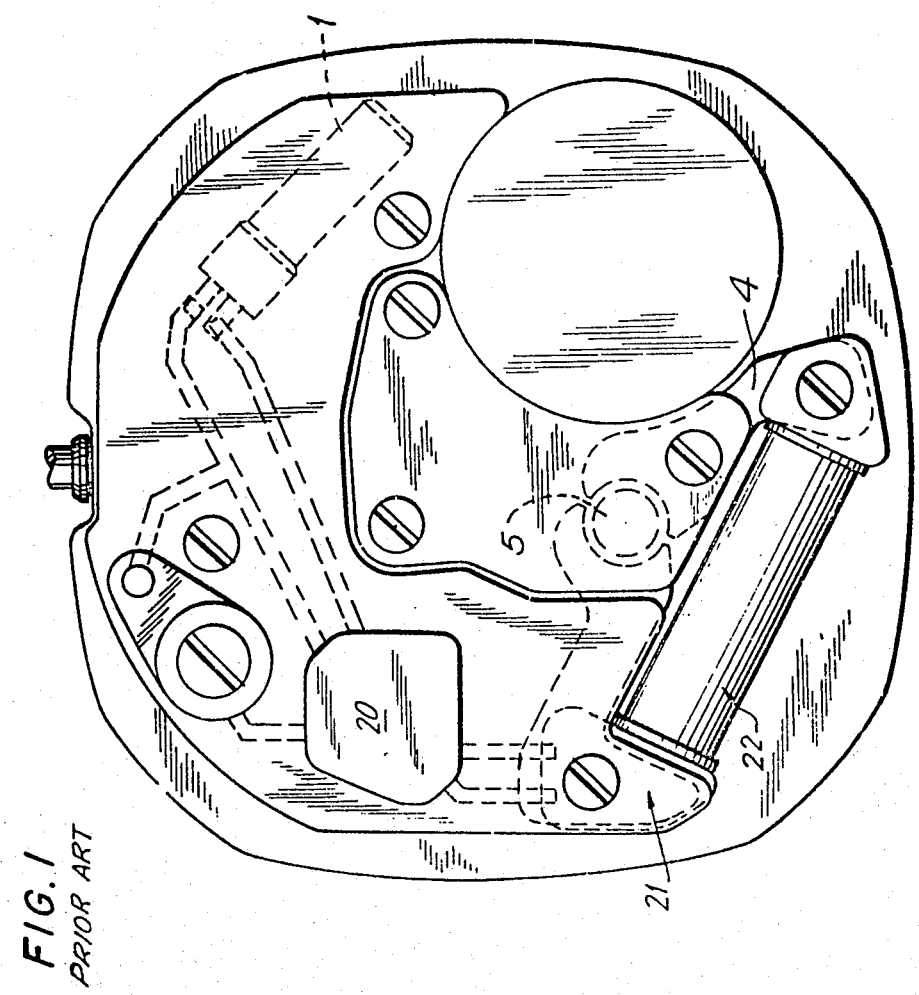
FIG. 1 is a plan view of an electronic wristwatch constructed in accordance with the prior art.

Reference is now made to FIG. 1, wherein an electronic wristwatch, constructed in accordance with the prior art, is depicted. The wristwatch includes a quartz crystal vibrator 1 capable of vibrating at frequencies on the order of 32 KHz for producing a high frequency time standard signal. The quartz crystal vibrator assembly 1 is coupled through leads to a timekeeping circuit chip 20, which circuit chip includes divider circuitry for receiving the high frequency signal produced by the quartz crystal vibrator assembly 1 and dividing same down and thereby producing a low frequency timekeeping signal. The low frequency timekeeping signal is applied to an electro-mechanical transducer assembly, generally indicated as 21, comprised of a step motor.

The step motor includes a permanent magnet rotor 5 surrounded by magnetic permeable stator pole 4. A coil assembly, generally indicated as 22, is coupled to the stator pole and, additionally, to the timekeeping circuit chip 20, for receiving the low frequency timekeeping signals produced thereby. Accordingly, in response to opposite polarity timekeeping signals applied to the coil assembly 22, the magnetic polarity of the stator poles 4 will be reversed, thereby effecting an incremental rotation of the rotor 5 in a conventional manner. The rotation of rotor 5 incrementally advances a plurality of gears, which gears are coupled to the second hand, minute hand and hour hand to thereby advance same in the usual manner.

As is detailed above, the step motor assembly converts electrical signals to magnetic fields, and effects incremental rotation of the rotor in response to changes in the orientation of the magnetic field. Since the step motor is not magnetically insulated, external magnetic fields can influence the operation of the electronic wristwatch. Accordingly, as is detailed below, the instant invention utilizes a magnetic shielding plate to cover the magnetically vulnerable portions of the electronic wristwatch movement to thereby reduce the affects of external magnetic fields thereon.

Figure 2:
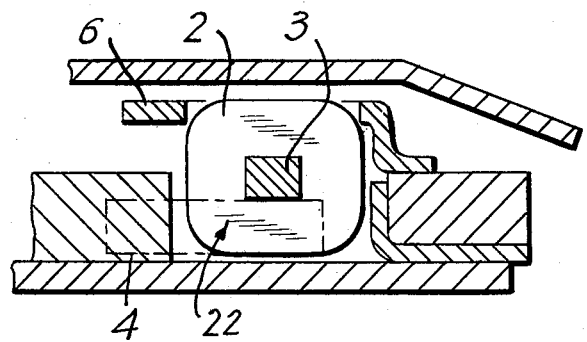
FIG. 2 is a sectional view of an electronic wristwatch having a shielding plate constructed in accordance with the instant invention.

Reference is now made to FIG. 2, wherein a portion of an electronic wristwatch movement, constructed in accordance with the instant invention, is depicted, like reference numerals being utilized to denote like elements described above. It is noted that as the thickness of the electronic wristwatch movement is reduced, the coil assembly 22 is positioned either immediately beneath the date wheel or dial and the rear case so that the thickness of the coil approximates the thickness of the entire electronic wristwatch movement.

The size of the coil assembly 22 and, in particular, the coil 2 is determined in accordance with the output torque requirements of the step motor. Specifically, $$T = IN$$

where T equals torque, I equals the current flow in the coil and N equals the number of coil turns. It is noted that the diameter of coil wire is on the order of 20 to 30 $\mu\phi$ and it is necessary to use wire having as large a diameter as possible in order to maximize the torque T. Additionally, the form of the coil is significant in order to obtain an increase in the number of turns, since an increase in the number of turns provides a like increase in the torque, in accordance with the formula detailed above.

Figure 3A:
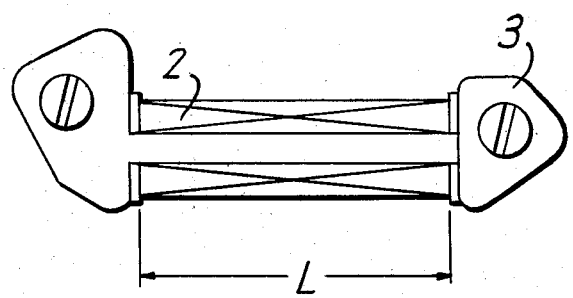
FIG. 3a is a plan view of a coil assembly for use in a step motor for an electronic wristwatch in accordance with the instant invention.
Figure 3B:
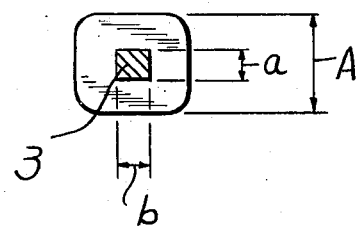

FIGS. 3a and 3b illustrate a core assembly 22 and, in particular, the shape of the coil 2 and elongated core 3. The elongated portion of the magnetic permeable core 3, having coil 2 wrapped therearound, is defined as having a length L. As illustrated in FIG. 3b, the thickness of the coil 2 is defined as A and the cross-sectional area of the coil core 3, taken perpendicular with respect to the lengthwise extent thereof, is a×b. Accordingly, if the thickness A of the coil must be limited in order not to increase the thickness of the electronic timepiece movement, the cross-sectional area of the coil should be maximized and the length L of the coil core should be as long as possible.

In order to obtain this result, the cross-sectional area $S_3$ of the coil core, defined as $S_3 = ab$, should be reduced as much as is possible in order to increase the number of turns of the coil without increasing the resistance of the coil. Accordingly, a ratio of the length of the coil core to the square root of the cross-sectional area defines a forming efficiency P of the coil core as follows:

$$P = \frac{L}{\sqrt{ab}}$$

Thus, the forming efficiency of a coil core having a length L of 10 mm and a height a of 0.6 mm and a width b of 0.8 mm defines a forming coefficient P of 14.4. It has been found that a forming coefficient P, in the order of 10 to 17, is required in order to meet the output torque requirement of a step motor in an electronic wristwatch.

In order to reduce the thickness of the electronic wristwatch movement, the coil is wound as many times as possible by reducing the cross-sectional area of the coil core, or alternatively, by reducing the height a of the coil core and increasing the width b of the coil core to obtain this result. Since the cross-sectional area $S_3 = a \times b$, $S_3$ cannot be very large and, additionally, since the length L of the coil core is limited and must permit the ampere turns to be secured thereto, the optimum forming coefficient for obtaining a very thin electronic wristwatch movement is on the order of 12 to 16.

Figure 4A:
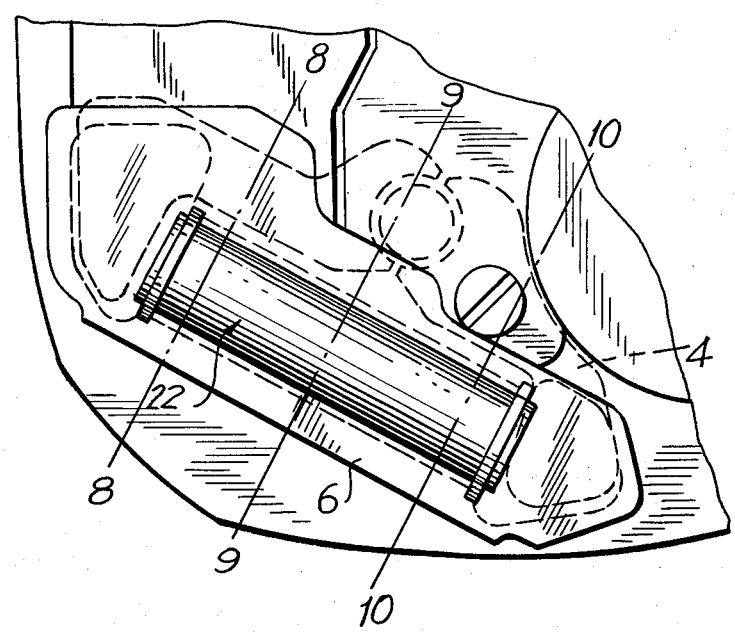
FIG. 4a is a plan view of the shielding plate for a step motor constructed in accordance with the instant invention.
Figure 4B:
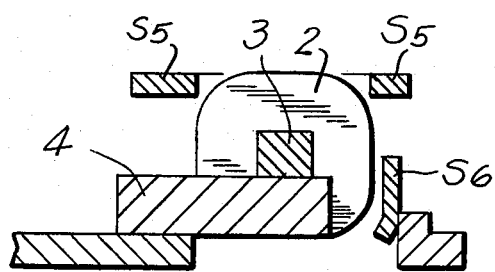
Figure 4C:
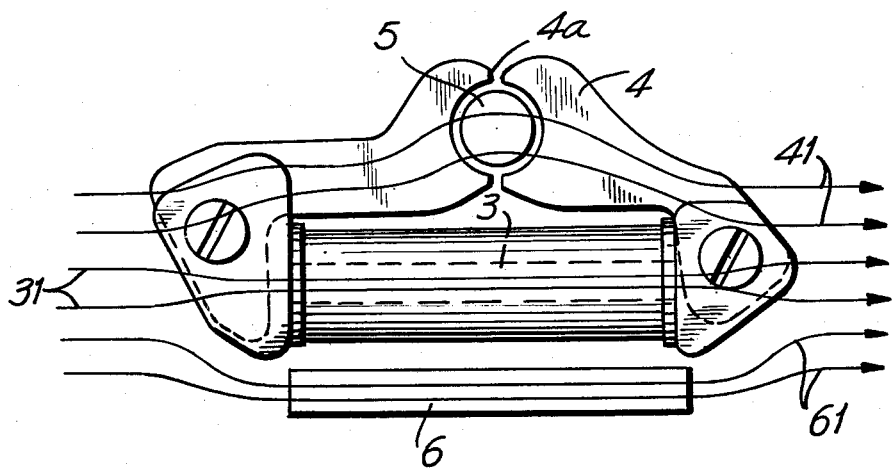
FIG. 4c is a plan view of a step motor assembly constructed in accordance with the instant invention, and the manner in which same is affected by an external magnetic field.

As is illustrated in FIG. 4c, an external magnetic field can prevent the rotor from being incrementally rotated in the usual manner. Specifically, in response to an external magnetic field, illustrated by the arrowed lines in FIG. 4c, a portion of the magnetic field 31 will pass through the iron core 3 of the core assembly, a portion 61 of the magnetic field will pass through the shielding plate 6, and the remaining portion 41, of the external magnetic field, will pass through the rotor, thereby affecting a predetermined magnetic orientation in these components, that prevents the rotor from being incrementally rotated in response to a change in magnetic orientation of the stator poles. It is for this reason that materials having a high permeability such as permalloy PC are utilized to form the magnetic permeable stator 4 and coil core 3. By forming the rotor and coil core of high permable materials, the efficiency with which the rotor is rotated is improved. The magnetic shielding plate 6 is formed of a maleable iron having a high permeability and equally high staturated magnetic flux density.

Specifically, the instant invention is directed to forming the magnetic shielding plate of the same magnetic material as the stator or, alternatively, a material having even a higher saturated flux density than the materials utilized to form the stator and iron core. For example, permalloy PB can be used to form the coil core since permalloy PB has a saturated magnetic flux density that is similar to that of maleable iron.

Turning to the dimensional characteristics of the shielding plate, depicted in FIGS. 4a through 4d, a characteristic of the shielding plate that is material to its configuration is the cross-sectional area $S_2$ of the shielding plate taken at an angle perpendicular to the longitudinal direction of the coil core 3. Specifically, as is illustrated in FIG. 4b, the cross-sectional area $S_2$ equals the sum total $S_2$ of the minimum cross-sectional areas of $S_5$ and $S_6$. As is illustrated in FIG. 4a, although the magnetic shielding plate is positioned to surround at least a portion of the coil along the entire lengthwise extent of the coil, the cross-sectional area of the shielding plate is determined by the configuration of the wristwatch movement, and hence is not uniform throughout. Accordingly, the cross-sectional area taken along line 8—8 in FIG. 4a is larger than the cross-sectional area taken along line 9—9 which, in turn, is larger than the cross-sectional area taken along line 10—10. It is noted that each cross-sectional area represents a cross sectional area taken perpendicular to the longitudinal axis of the coil core. More importantly, the minimum cross-sectional area taken along line 10—10 is the first cross-sectional area of the shielding plate to become saturated by the external magnetic field and, hence, control the amount of the external magnetic field that will be directed through the shielding plate. Stated otherwise, the shielding plate 6, illustrated in FIG. 4a, will exhibit the characteristics of a shielding plate that is uniform throughout with a cross-sectional area taken along line 10—10, as a result of this being the minimum cross-sectional area taken perpendicular to the longitudinal axis of the iron core. Moreover, for the purpose of the instant invention, the minimum cross-sectional area of the shielding plate, taken perpendicular to the lengthwise extent of the coil core, is defined as the minimum cross-sectional area $S_2$ of the shielding plate. The minimum value of $S_2$ equals $S_2$ whether a single magnetic shielding plate is provided, or equals the sum of the respective minimum cross-sectional areas $S_2$ with respect to the coil winding portion of the cross-sectional area of each magnetic shielding plate when two or more magnetic shielding plates are provided.

As is illustrated in FIG. 4c, the worst condition occurs when the external magnetic field through the step motor of the electronic wristwatch is parallel to the lengthwise extent of the coil assembly, since the coil core and magnetic shielding plate provide the minimal cross-sectional area for saturation. This condition is represented in FIGS. 5 and 6 discussed hereinafter, and is the condition utilized to obtain the experimental readings discussed with respect to FIGS. 5 and 6.

Figure 4D:
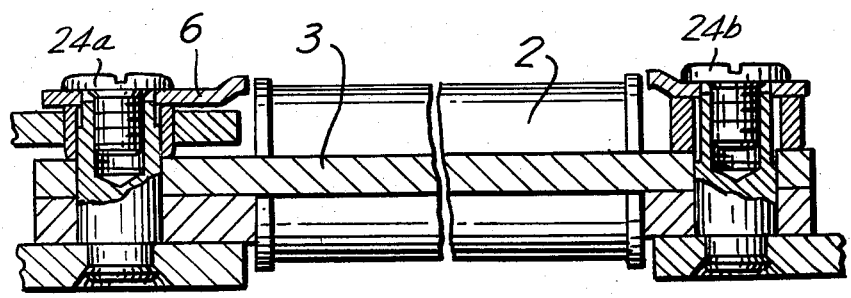

As is illustrated in FIG. 4d, the magnetic shielding plate 6 is fixedly secured to the step motor movement 21 by the same screws 24 and 25 utilized to secure the coil core to the step motor movement. Moreover, by positioning the magnetic shielding plate in the manner illustrated in FIGS. 4a through 4d, the screws 24a and 24b can be readily removed to thereby permit access to the step motor mechanism to effect the necessary adjustments and repairs thereto.

Figure 5:
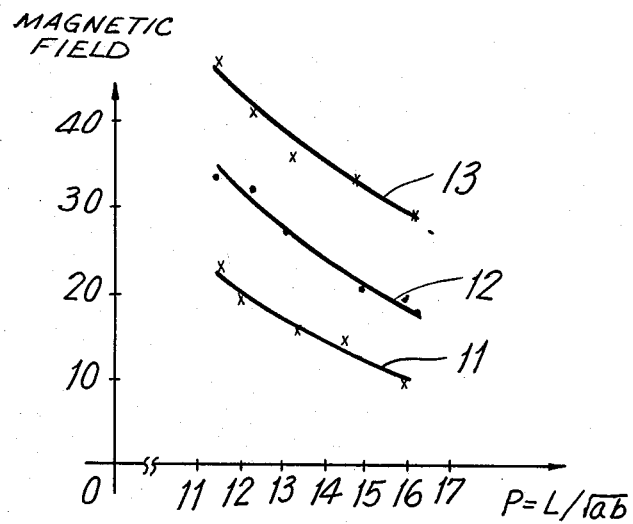
FIG. 5 is a graphical comparison of the affects of magnetic fields on step motors wherein the forming coefficient of the magnetic core of the core assembly is varied.
Figure 6:
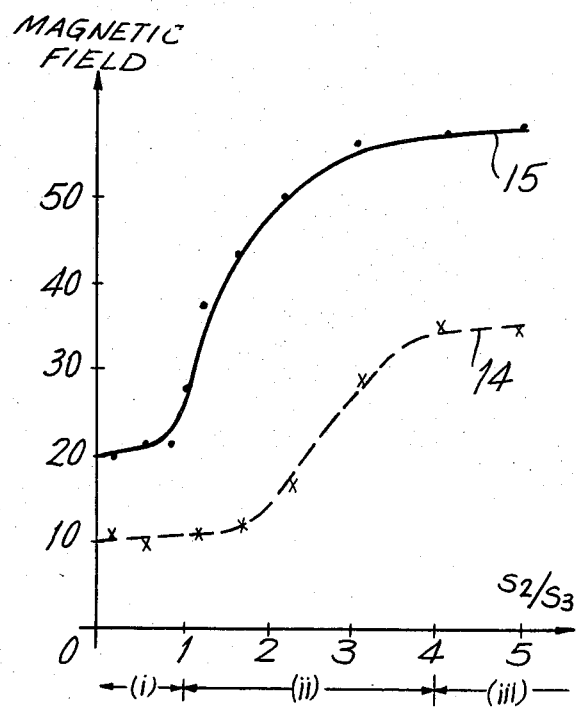
FIG. 6 is a graphical comparison of the affect of external magnetic fields to changes in the ratio of the cross-sectional area of a magnetic shielding plate to the cross-sectional area of the magnetic core of a coil assembly.

Turning now to FIG. 5, a graphical analysis wherein the abscissa represents the forming coefficient of the coil core and the ordinate represents the strength of the external magnetic field in oersteds is presented. As noted above, the forming coefficient P is expressed as being equal to $L\sqrt{ab}$. Accordingly, the forming coefficient P is increased if the length L of the iron core is increased and the cross-sectional area of the coil core is maintained constant. However, if the length L of the coil core is maintained constant, the forming coefficient P can be increased by reducing the cross-sectional area a of the coil core 3.

Accordingly, the curves 11, 12 and 13 represent the points at which the rotor will stop rotating or not function properly as a result of the magnitude of an external magnetic field applied to the step motor. Curve 11 illustrates that the smaller the forming coefficient of the coil core, the greater the ability of the step motor to operate in a normal fashion. Conversely, the larger the forming coefficient of the coil core, the smaller the magnetic field that will cause a disturbance to the operation of the motor.

Curve 12 illustrates the response of a coil core, formed of permalloy PB having a uniform cross-sectional area. Curve 12 demonstrates that the incremental rotation of the rotor is less likely to be disturbed because the saturated magnetic flux density of the permalloy PB is higher than that of permalloy PC.

Finally, if the cross-sectional area of the magnetic shielding plate is approximately equal to the cross-sectional area $S_3$ of the coil core 3, the greatest resistance to magnetic fields is obtained. This is particularly illustrated by curve 13 in FIG. 5.

FIG. 6 illustrates a graphical comparison between the ratio of the minimum cross-sectional area $S_2$ of a shielding plate and the minimum cross-sectional area $S_3$ of the coil core 3, and the manner in which same affects the operation of a step motor in response to external magnetic fields applied substantially parallel thereto. Curve 14 in FIG. 6. represents a step motor wherein the coil core is formed from permalloy PC and wherein the cross-sectional height a is 0.6 mm, the cross-sectional width b is 0.8 mm and the length L of the coil core is 9.5 mm. Accordingly, the forming coefficient is $$15.3 \left[ \left( \frac{9.5}{0.6 \times 0.8} \right) \right].$$

Similarly, curve 15 in FIG. 6, represents the response when the coil core is formed of permalloy PB having the same dimensional requirements as a step motor having a coil core formed of permalloy PC represented by curve 14.

Accordingly, as the intensity of the external magnetic field increases, and is applied parallel to the coil assembly, the ratio of the minimum cross-sectional area of the shielding plate to the minimum cross-sectional area of the iron core determines the manner in which the step motor will be affected as the intensity of the external magnetic flux field, applied thereto, is increased. Specifically, as is detailed at length below, when the ratio $S_2/S_3$ is less than one, namely, when the minimum cross-sectional area of the shielding plate is less than the minimum cross-sectional area of the coil core, the shielding plate is substantially ineffective. However, the magnetic shielding plate becomes particularly effective as the minimum cross-sectional area $S_2$ of the shielding plate approaches the minimum cross-sectional area $S_3$ of the coil core. Moreover, once the minimum cross-sectional area $S_2$ becomes more than five times larger than the minimum cross-sectional area $S_3$ of the coil core ($S_2 > 5S_3$), there is no further benefit obtained by further increasing the ratio of $S_2$ to $S_3$.

Turning to the first condition, when $0 < S_2/S_3 < 1$, condition occurs, as is illustrated in FIG. 4c, the shielding plate becomes rapidly saturated by the external magnetic flux field, and accordingly, the magnetic flux field heavily saturates the coil core, thereby defining a predetermined orientation in the stator and, hence, causing a disturbance in the operation of the step motor in response to a relatively low external magnetic field applied thereto. Although the portion 41 of the external magnetic field passed through stator 4 saturates same, it will not prevent movement of the rotor because the drawings power caused by the permanent magnet rotor 5 and the gap 4a between same and the stator is greater than the saturation density of the iron core.

However, when $1 < S_2/S_3 < 5$, the external magnetic field is divided into, and passed through, the minimum cross-sectional area $S_3$ of the coil core and the minimum cross-sectional area $S_2$ of the magnetic shielding plate 6. Thus, when the material of the coil core is permalloy PB, the saturated magnetic flux density of the coil core approaches that of the magnetic shielding plate, thereby reducing the speed with which the coil core is saturated, so that the rotation of the rotor will not be disturbed or prevented unless a particularly large external magnetic field is applied to the step motor. More importantly, in terms of space efficiency, a ratio of $S_2/S_3$ between one and five is most effective in selecting the dimensions of the magnetic shielding plate 6.

Finally, when a condition of $5S_2/S_3$ or greater occurs, the minimum cross-sectional area of the magnetic shielding plate need not be increased since the absolute value of the magnetic flux that passes through the stator 4 and coil core 3 does not get considerably larger, even if the minimum cross-sectional area of the magnetic shielding plate 6 is increased. Accordingly, in order to minimize the effect of external magnetic fields, and at the same time minimize the space utilized for a shielding plate in the electronic wristwatch movement, it is important to note that a continuing increase in the size of the shielding plate, with respect to the coil core will not result in a marked improvement in the ability of the shielding plate to prevent against disturbances from external magnetic fields.

It should be noted that an external magnetic field, on the order of 30 to 40 oersteds, is applied to a step motor of an electronic wristwatch when same is placed near the receiver of a telephone. Heretofore, the shielding ability of conventional electronic wristwatches has been on the order of 20 to 30 oersteds. Moreover, this was obtained by utilizing a shielding plate covering the entire electronic movement. However, the instant invention permits a shielding plate, having a minimum cross-sectional area perpendicular to the lengthwise extent of the coil core that is within a range of being equal to or about five times as large as the minimum cross-sectional area of the coil core, with the shielding plate having a lengthwise extent substantially equal to the lengthwise extent of the coil, thereby rendering it unnecessary to utilize a shielding plate covering the entire movement.

Accordingly, the instant invention permits the optimum shielding affects to be obtained with a shielding plate utilizing a minimum amount of space within the wristwatch. Moreover, as is illustrated in FIG. 2, the space such as the portion of the coil can be utilized freely since it is only necessary that the sum total of the minimum cross-sectional areas of the magnetic shielding plate, transverse to the orientation of the coil assembly, meet the requirements noted above, and will therefore provide a thinner and less expensive wristwatch movement.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In an electronic wristwatch including a step motor for receiving timekeeping signals and converting same into an incremental rotary motion, the improvement comprising a permanent magnet rotor, a magnetic permeable stator surrounding said rotor for incrementally rotating said rotor in response to changes in the magnetic orientation of said stator, and coil means including an elongated magnetic permeable coil core and a coil wrapped therearound, said coil being adapted to receive timekeeping signals and in response thereto change the magnetic orientation of said stator, and magnetic shield means extending the lengthwise extent of the coil, said shield means including a shield plate having an opening therein for permitting said coil to be disposed in the opening of said plate to thereby surround said coil and having minimum cross-sectional area transverse to the lengthwise extent of said magnetic permeable core, the ratio of said minimum cross-sectional area of the shielding plate in a direction transverse to the lengthwise extent of the coil core to the minimum cross-sectional area of the coil core taken transverse to the lengthwise extent of the coil core, is at least one and no greater than five to thereby provide a reduced dimensional shielding plate and hence a reduction in the thickness of the timepiece.

2. An electronic wristwatch as claimed in claim 1, wherein said magnetic shielding means is a magnetic permeable plate secured to said step motor by fastening screw means.

3. An electronic wristwatch as claimed in claim 2, wherein said plate is adapted to be releaseably secured to said step motor by removal of said fastening screw means.

4. An electronic wristwatch as claimed in claim 1, wherein said shielding plate is releasably secured to said coil core and said step motor by said screw means.

5. An electronic wristwatch as claimed in claim 1, wherein the magnetic permeability of said coil core and said magnetic shielding plate is larger than the magnetic permeability of said stator.

6. An electronic wristwatch as claimed in claim 1, and including a base plate, said magnetic permeable stator, said permanent magnet rotor and said coil being supported on said base plate, said base plate having an opening therein, at least a portion of said coil being disposed in said opening in said base plate.

7. An electronic wristwatch as claimed in claim 1, wherein said shield plate, said rotor and said stator are each positioned so that imaginary planes that pass therethrough are parallel to each other and pass through at least one of said coil and coil core.

* * * * *